United States Patent
Costa et al.

(10) Patent No.: US 9,792,427 B2
(45) Date of Patent: Oct. 17, 2017

(54) TRUSTED EXECUTION WITHIN A DISTRIBUTED COMPUTING SYSTEM

(71) Applicant: Microsoft Corporation, Redmond, WA (US)

(72) Inventors: Manuel Costa, Cambridge (GB); Felix Schuster, Bochum (DE); Cedric Fournet, Cambridge (GB); Christos Gkantsidis, Ely (GB); Marcus Peinado, Bellevue, WA (US); Antony Ian Taylor Rowstron, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 80 days.

(21) Appl. No.: 14/175,692

(22) Filed: Feb. 7, 2014

(65) Prior Publication Data

US 2015/0229619 A1    Aug. 13, 2015

(51) Int. Cl.
*H04L 9/32* (2006.01)
*G06F 21/44* (2013.01)
*H04L 29/06* (2006.01)
*G06F 21/57* (2013.01)

(52) U.S. Cl.
CPC ............ *G06F 21/445* (2013.01); *G06F 21/57* (2013.01); *H04L 63/0823* (2013.01); *H04L 63/12* (2013.01)

(58) Field of Classification Search
CPC ........................................ G06F 9/5061–9/5077
See application file for complete search history.

(56) References Cited

U.S. PATENT DOCUMENTS

| | | | |
|---|---|---|---|
| 8,381,015 B2* | 2/2013 | Kaminski | 714/4.1 |
| 8,839,363 B2* | 9/2014 | Spiers et al. | 726/3 |
| 2005/0120219 A1* | 6/2005 | Munetoh et al. | 713/176 |
| 2005/0132202 A1* | 6/2005 | Dillaway | H04L 9/0825 713/179 |

(Continued)

OTHER PUBLICATIONS

Hoekstr, Matthew, "Intel® SGX for Dummies (Intel® SGX Design Objectives)", Published on: Sep. 26, 2013, Available at: http://software.intel.com/en-us/blogs/2013/09/26/protecting-application-secrets-with-intel-sgx.

(Continued)

*Primary Examiner* — Dede Zecher
*Assistant Examiner* — Vadim Savenkov

(57) ABSTRACT

Methods for enforcing confidentiality and integrity of code and data while running the code over the data in a distributed computing system are described. In an embodiment each machine which processes data within the system provides a secure sub-system which is protected from other parts of the machine and which receives encrypted data and encrypted code, processes the data using the received code and outputs encrypted data. When establishing the secure sub-systems, keys are exchanged between the client and secure sub-systems and the secure sub-systems provide an attestation confirming the identity of the code running in the secure sub-systems and confirming that the code is running on genuine secure sub-systems. In another embodiment a dataflow computation system is described in which chunks of input data, each comprising an identifier, are authenticated/encrypted. The identifiers are used within the system to confirm that each chunk is processed exactly once.

20 Claims, 8 Drawing Sheets

(56) References Cited

U.S. PATENT DOCUMENTS

| | | | |
|---|---|---|---|
| 2005/0246552 A1* | 11/2005 | Bade | G06F 21/53 713/193 |
| 2007/0079120 A1* | 4/2007 | Bade | G06F 21/57 713/166 |
| 2008/0086442 A1* | 4/2008 | Dasdan et al. | 707/1 |
| 2008/0144825 A1* | 6/2008 | Dias et al. | 380/259 |
| 2009/0154709 A1* | 6/2009 | Ellison | H04L 9/083 380/282 |
| 2011/0302415 A1* | 12/2011 | Ahmad et al. | 713/168 |
| 2013/0007889 A1* | 1/2013 | McCloy | 726/26 |
| 2013/0185812 A1* | 7/2013 | Lie et al. | 726/29 |
| 2014/0089658 A1* | 3/2014 | Raghuram et al. | 713/155 |
| 2014/0101715 A1* | 4/2014 | Kundu et al. | 726/1 |
| 2014/0281531 A1* | 9/2014 | Phegade et al. | 713/168 |
| 2014/0310510 A1* | 10/2014 | Potlapally et al. | 713/2 |
| 2015/0134965 A1* | 5/2015 | Morenius et al. | 713/172 |

OTHER PUBLICATIONS

Wei, et al., "SecureMR: A Service Integrity Assurance Framework for MapReduce", In Proceedings of Annual Computer Security Applications Conference, Dec. 7, 2009, 10 pages.

Ariel, "Cloud Encryption—a Fundamental First Step in Cloud Security", Published on: Mar. 7, 2012, Available at: http://www.porticor.com/2012/03/cloud-encryption-must-have/.

Hao, et al., "Trusted Block as a Service: Towards Sensitive Applications on the Cloud", In IEEE 10th International Conference on Trust, Security and Privacy in Computing and Communications (TrustCom), Nov. 16, 2011, 10 pages.

"Enter: TrulyProtect an Innovative Crypto-Based Copy Protection System", In White Paper, Sep. 2013, 14 pages.

Coppola, et al., "Trusted Computing on Heterogeneous Embedded Systems-on-Chip with Virtualization and Memory Protection", In Proceedings of Fourth International Conference on Cloud Computing, GRIDs, and Virtualization, May 2013, 5 pages.

Xiao, et al., "Security and Privacy in Cloud Computing", In IEEE Communications Surveys and Tutorials, vol. 15, Issue 2, Jul. 2012, 17 pages.

Ko, et al., "The HybrEx Model for Confidentiality and Privacy in Cloud Computing", In Proceedings of 3rd USENIX Workshop on Hot Topics in Cloud Computing, Jun. 14, 2011, 5 pages.

Banirostam, et al., "A Trust Based Approach for Increasing Security in Cloud Computing Infrastructure", In Proceedings of 15th International Conference on Computer Modelling and Simulation, Apr. 10, 2013, 5 pages.

Gupta, Dr. Sarbari, "Securely Managing Cryptographic Keys used within a Cloud Environment", In Proceedings of Cryptographic Key Management Workshop in National Institute of Standards and Technology, Sep. 10, 2012, 13 pages.

Dean, et al., "MapReduce: Simplified Data Processing on Large Clusters", In Magazine Communications of the ACM, vol. 51, Issue 1, Jan. 1, 2008, 7 pages.

Roy, et al., "Airavat: Security and Privacy for MapReduce", In Proceedings of the 7th USENIX Conference on Networked Systems Design and Implementation, Apr. 28, 2010, 16 pages.

Santos, et al., "Policy-Sealed Data: A New Abstraction for Building Trusted Cloud Services", In Proceedings of the 21st USENIX Conference on Security Symposium, Aug. 8, 2012, 14 pages.

* cited by examiner

TRUSTED EXECUTION WITHIN A DISTRIBUTED COMPUTING SYSTEM

BACKGROUND

Distributed computing systems, such as cloud computing systems, are used by users to execute code on large volumes of data. Use of a third party computing system (e.g. one run by a cloud computing provider rather than the user themselves) provides flexibility to the user as they can pay for computing resources only when they are required. However, the user's lack of control over the infrastructure within the distributed computing system does lead to security concerns. In particular, users may wish to maintain the confidentiality and integrity of both the code being run and the data which is processed by the code. Currently however, a malicious system administrator is able to access (and potentially steal) both the user's code and data. Likewise, a malicious hacker may be able to exploit a vulnerability in the distributed system's code (e.g. a bug in the cloud provider's operating system software) to access and potentially steal the user's code and data.

The embodiments described below are not limited to implementations which solve any or all of the disadvantages of known distributed computing systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Methods for enforcing confidentiality and integrity of code and data while running the code over the data in a distributed computing system are described. In an embodiment each machine which processes data within the system provides a secure sub-system which is protected from other parts of the machine and which receives encrypted data and encrypted code, processes the data using the received code and outputs encrypted data. When establishing the secure sub-systems, keys are exchanged between the client and secure sub-systems and the secure sub-systems provide an attestation confirming the identity of the code running in the secure sub-systems and confirming that the code is running on genuine secure sub-systems. In another embodiment a data-flow computation system is described in which chunks of input data, each comprising an identifier, are authenticated/encrypted. The identifiers are used within the system to confirm that each chunk is processed exactly once.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
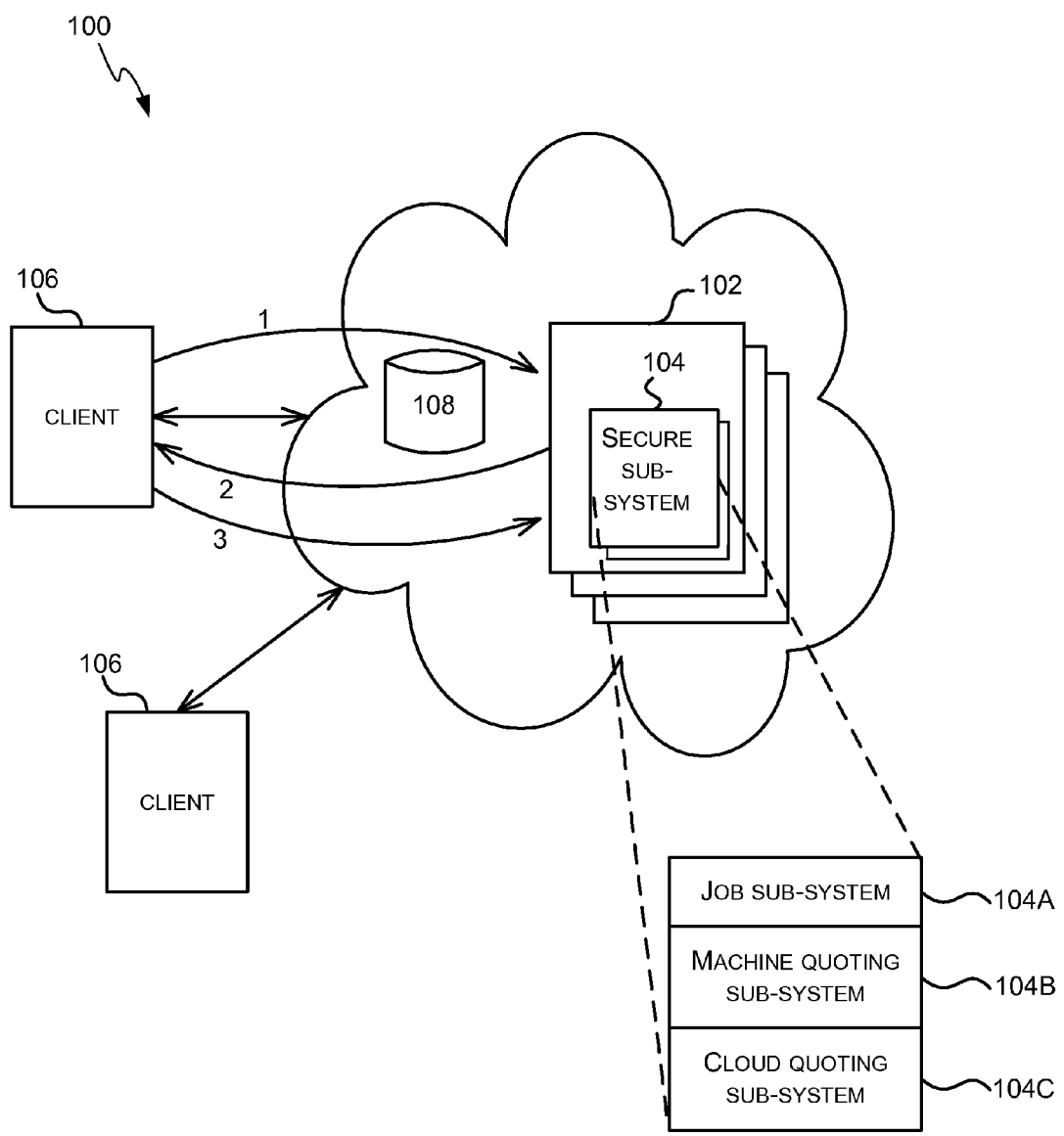
FIG. 1 is a schematic diagram of a distributed computing system.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

As described above, distributed computing systems (such as cloud computing systems) which are operated by a third party (and not the user) raise security concerns for users because the system provider (e.g. the cloud provider) is in control of both the hardware and software of its system infrastructure. This means that the system provider has the ability to access (and potentially steal) the code and data of users of the system. Furthermore, results of computations performed within the distributed computing system may be corrupted by a malicious system provider dropping messages and/or inserting new ones which purport to be part of the computation. Likewise, a malicious hacker may be able to exploit a vulnerability in the distributed system's code (e.g. a bug in the cloud provider's operating system software) to access and potentially steal the user's code and data, or to interfere with the computations running in the system in order to make them produce incorrect results.

Systems and methods are described below in a first part of the description (with reference to FIGS. 1-5) which enable a user to retain control over sensitive code and data when performing a distributed computation involving multiple machines without the need to fully trust the system provider or the systems software (e.g. operating systems and virtual machine monitors) running on the system. The systems and methods may also be used by groups of users to pool sensitive data for a particular data-analysis task without disclosing the whole input dataset to each user in the group. For example, this may enable a group of competitors to benchmark their data and disclose aggregate numbers without disclosing the details to one another.

These systems and methods use secure sub-systems which are provided by machines within the distributed computing system. In order to execute a distributed computation (or job), a secure sub-system is established on each machine that processes data as part of the computation. When establishing the secure sub-systems, keys are exchanged between the client and the secure sub-systems and the secure subsystems each provide an attestation confirming the identity of the code running in that particular secure sub-system and confirming that the code is running on genuine secure sub-system (i.e. that the particular secure sub-system is a genuine secure sub-system). The key exchange establishes keys for the secure sub-systems to securely communicate with one another, as well as with the client, in order to execute a distributed computation.

Systems and methods are also described below in a second part of the description (with reference to FIGS. 6-7) which enable integrity checking of the output from computations run in a distributed computing system, e.g. within a MapReduce infrastructure. The methods identify if messages or inputs are dropped, duplicated or added and a final output may only be accepted by the client (or in some examples generated by an intermediate node) if no such anomalies are identified.

The systems and methods from the first and second parts of the description may be used together (e.g. within a MapReduce infrastructure) or they may be used independently of each other. The systems and methods from the first part of the description are not limited to use within a MapReduce infrastructure and may be used in any distributed computing system. The systems and methods from the second part of the description are not limited to use within a MapReduce infrastructure and may be used in any distributed computation where the distributed notes communicate by exchanging messages. Examples include computations that may be specified as a data-flow graph where nodes perform arbitrary computations and the edges represent data-flow (and these may be referred to as 'data-flow computations). Further examples include iterative computations. Any reference to use of a MapReduce infrastructure in the following description is by way of example.

FIG. 1 is a schematic diagram of a distributed computing system 100 which comprises a plurality of machines 102. Each machine 102 is arranged to provide one or more secure sub-systems 104 which are protected from the rest of the machine. The term 'protected' is used herein to describe how a trusted component (e.g. an interface) within the machine (which may for example be a piece of logic within a CPU) controls (and limits) interaction between a secure sub-system 104 and the rest of the machine 102. In various examples, this trusted component performs the following two tasks (and may perform other tasks): (1) access control, i.e. it decides which pieces of code get access to the data, which prevents, for example, a corrupted operating system from accessing sensitive data, and (2) encryption when the data flows out of the secure sub-system, for example if the secure sub-system is inside a physical CPU chip package this prevents attacks where a malicious person copies the contents of system memory. The one or more secure sub-systems 104 which are provided by a machine 102 may be created/destroyed dynamically under the control of a management system running on the machine. The management system may also have distributed components running on other machines.

As is described in more detail below, encrypted user code and user data can be passed into a secure sub-system 104 where the code and data is decrypted and the code run on the data. The results are then encrypted before leaving the secure sub-system 104. As a result the decrypted code, input data and output data is not accessible to any parts of the machine 102 which are outside the secure sub-system 104.

A machine 102 may be a hardware CPU (central processing unit), a set of hardware processing elements including a secure co-processor (for example a trusted platform module—TPM, security logic in a field-programmable gate array, or other secure co-processor) or it may be a VM (virtual machine). Where the machine is a hardware CPU, it may for example be an Intel® SGX CPU which provides secure sub-systems which are called 'enclaves', an IBM SecureBlue++™ CPU or a CPU from another manufacturer. Where a hardware CPU is used, the secure sub-system 104 is part of the same chip as the rest of the machine 102 and as a result the full computation power (or close to the full power) of the CPU may be used within the secure sub-system 104. Where the machine 102 is a VM, the VM may be partitioned into two different VMs—a small trusted VM which operates as the secure sub-system and a larger VM, where the small VM is protected from the larger VM. In one example the trusted VM is protected using virtualization techniques such as, for example, the ones described in the paper "CloudVisor: Retrofitting Protection of Virtual Machines in Multi-tenant Cloud with Nested Virtualization" by Zhang et al. from the Symposium on Operating Systems Principles 2011. In another example, the trusted VM runs cryptographic software that is able to run computations on encrypted data.

The system 100 further comprises one or more clients 106 which are used by users to pass code and data to the machines 102. The system 100 may further comprise one or more data stores 108 on which user data and/or code can be stored in advance of running a job within the system 100 (i.e. the data and/or code may be pre-loaded into the distributed computing system).

As also shown in FIG. 1, a machine 102 may be arranged to provide a number of secure sub-systems 104 and in the example shown there are three secure sub-systems: a job secure sub-system 104A, a machine quoting secure sub-system 104B and a cloud (or distributed computing system) quoting secure sub-system 104C. The job secure sub-system 104A is configured to run the job code provided by a client whilst the two quoting secure sub-systems 104B, 104C are configured to attest (or confirm) the identity of the machine/sub-system at different levels of specificity (or granularity). In other examples, a machine may comprise fewer than three secure sub-systems, e.g. a machine may not comprise a cloud quoting secure sub-system 104C (but comprises two sub-systems 104A and 104B). In further examples, a machine 102 may comprise more than three secure sub-systems (e.g. multiple job sub-systems 104A or additional quoting sub-systems to provide further levels of granularity of attestation).

The machine quoting secure sub-system 104B stores (or has access to) key(s) issued by the machine manufacturer (and which may be hardcoded within the machine) and which cannot be accessed by other parts of the machine. These key(s) are used to attest that a certain datagram was indeed produced inside a secure sub-system on a chip manufactured by (or to the design of) the manufacturer, e.g. inside an Intel® SGX secured enclave or inside a secure sub-system on an IBM SecureBlue++™ CPU. In an example, the key(s) may be used to sign a message which is then sent to the client.

Similarly, the cloud quoting secure sub-system 104C stores (or has access to) key(s) issued by the system (e.g. cloud) provider and which cannot be accessed by other parts of the machine and cannot be accessed by any machine that is not part of the system. In an example, the private key of a cloud quoting secure sub-system 104C may be generated and then sealed to the measurement of the cloud quoting secure sub-system 104C (e.g. using the sealing key delivered by EGETKEY as described in 'Innovative instructions and software model for isolated execution' by Mckeen et al and published in Workshop on Hardware and Architectural Support for Security and Privacy, Tel-Aviv 2013). The sealed private keys are then written to disk and the plaintext private keys are erased. On each subsequent invocation, the cloud quoting secure sub-system 104C unseals the private key material again and uses it for serving attestation requests.

In one example, the key may be generated inside a trusted environment itself, such that the key generation process cannot be observed by attackers (e.g. running a key generation program inside an Intel® SGX enclave). In another example the key may me generated externally and then "inserted" into the trusted environment. These keys used for attestation are really public/private key pairs. The specific algorithms used for generating/using these keys may, for example, be traditional (e.g. RSA) public crypto systems where for each private key (used to sign a datagram) there is a single matching public key (used to verify the signature), or they may be "group signature schemes", where a single public key can be used to verify signatures from any private key associated with the public key.

The key(s) in the cloud quoting secure sub-system 104C are used to attest that a certain datagram was indeed produced inside a secure sub-system within a particular system/cloud or part thereof, e.g. inside the Windows Azure™ USA cloud, and any level of granularity (or specificity) may be used (e.g. geographical region/operating company/political boundaries). In other examples, other custom quoting secure sub-systems may be used instead of, or in addition to, the cloud quoting secure sub-system, to attest any characteristic of the machine/system (e.g. cost, processing power, reliability, model, manufacture date, etc.).

In examples where both a machine quoting secure sub-system 104B and cloud quoting secure sub-system 104C are used, the resultant attestations enable a user/client to check that their distributed computation is being performed in sub-systems which are secure and that the secure sub-systems belong to the correct system/cloud (or part thereof).

Figure 2:
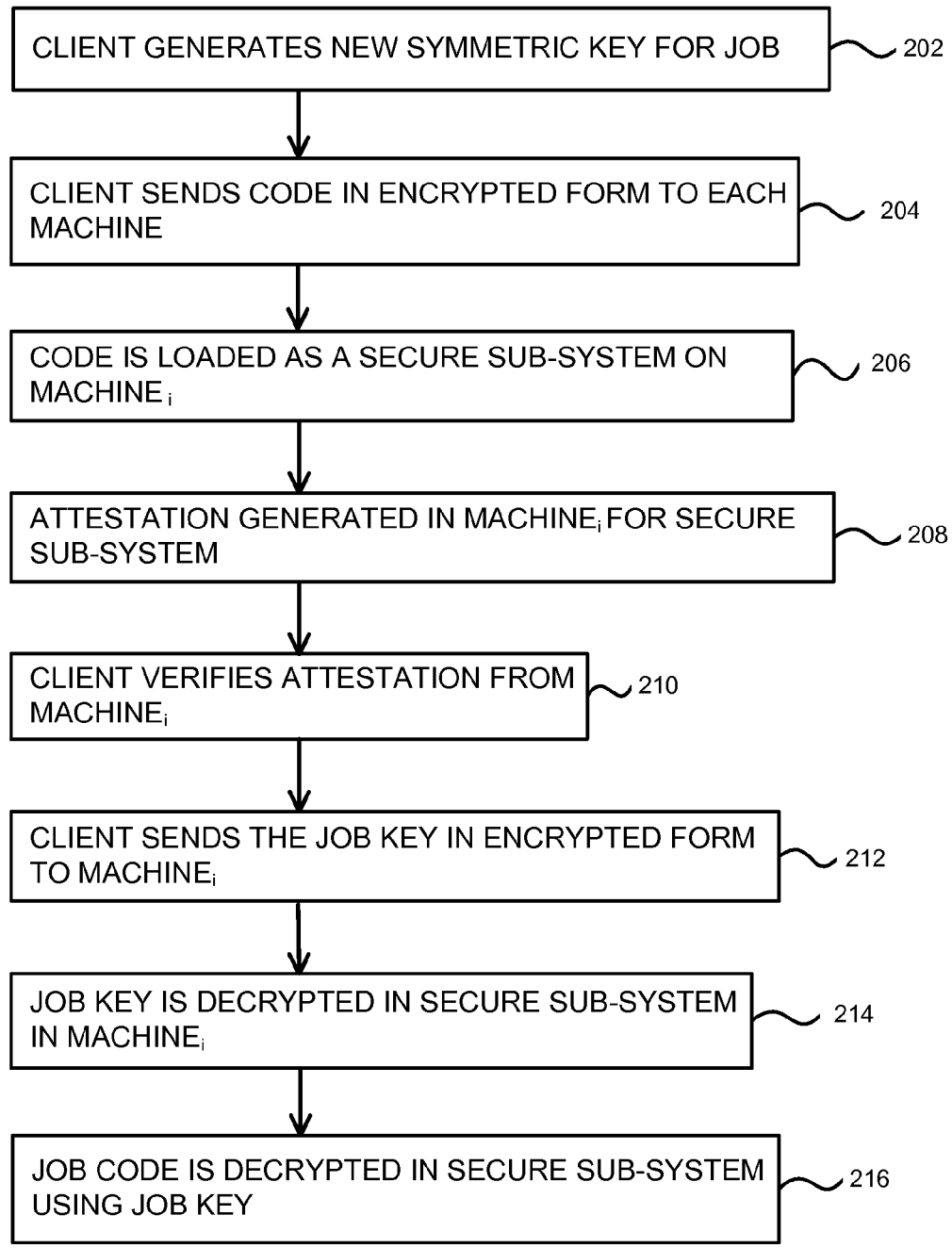
FIG. 2 is a flow diagram showing an example method of operation of a distributed computing system such as shown in FIG. 1.

FIG. 2 is a flow diagram showing an example method of operation of a distributed computing system 100, such as shown in FIG. 1 for a single user. This method uses a number of different encryption keys which may include one or more of:

$K_{user}$ (or $K_{client}$)—this is a public key (e.g. a long term public key) for the user $K_i$—this is a symmetric job key generated by a secure sub-system on machine i $K_{job}$ (or $K_{code}$)—this is a key used to encrypt the code for the job (the terminology $K_{code}$ may be used instead of $K_{job}$ where the same key is used for the same code across multiple jobs, rather than using a different key for each job even though the same code is reused)

$K_{in}$ (or $K_{data}$)—this is a key used to encrypt the input data for the particular job and where the job uses data from multiple users there may be multiple input data keys, one for each user (e.g. $K_{inA}$, $K_{inB}$, $K_{inC}$, etc.)

$K_{out}$ (or $K_{result}$)—this is a key used to encrypt the output data (i.e. the results) from the particular job and where the job is for multiple users there may be multiple results keys, one for each user (e.g. $K_{outA}$, $K_{outB}$, $K_{outC}$, etc.) or they may all have access to the results and so there may only be one results key $K_{map}$—this is a key which is used to encrypt any intermediate results, for example where the computation is split between multiple machines (e.g. where a MapReduce framework is used), this key is distributed by the client (rather than by a master in the cloud) and may, in some examples, be embedded within the job code It will be appreciated that in some examples, not all of these keys may be used and in various examples the values of some of the keys may be the same (e.g. the same value may be used for $K_{job}$, $K_{in}$ and $K_{out}$).

Of the keys listed above, $K_{job}$, $K_{in}$, $K_{map}$ (where used) and $K_{out}$ are all distributed by the client (and not the system operator). In some examples, $K_{map}$ may be distributed within the job code. $K_i$, however, is generated within a secure sub-system on machine i. $K_{user}$ may be issued to the client by an issuing entity or generated by the client.

When a user wants to run a job within the distributed computing system 100, they may first negotiate with the provider of the system to obtain sufficient resources (e.g. 20 machines). This negotiation process is not shown in FIG. 2 and is assumed to have already been performed (if required), such that at the start of the method shown in FIG. 2, the client 106 has details of the resources (e.g. the machines 102) which are to be used for the particular job. In another example, the user does not need to know upfront which machines will be used for the job, and the provider informs the user (i.e. the user's systems) interactively as the job execution progresses. In such an example, blocks 204 to 216 of the method shown in FIG. 2 may be repeated as new machines are added to the job.

The client 106 generates a new symmetric key $K_{job}$ for the job (block 202) and sends the job code in encrypted form to each of a plurality of machines 102 which are to perform the job (block 204 and arrow 1 in FIG. 1), e.g. to each allocated CPU where the machines are hardware CPUs. The job code is encrypted using the job key $K_{job}$ and may be sent with some public (i.e. unencrypted) code for the sub-system, which may be referred to as a 'loader', an identifier, j, for the job and the user's public key, $K_{user}$. For the purposes of the following description, the operation of a single machine i is described, but it will be appreciated that the same method will be implemented at each allocated machine, i.e. each machine that receives the job code sent by the client (in block 204), and each job is executed on multiple machines.

The some or all of the code received by machine i (e.g. the encrypted job code, the loader, the identifier and the public key) is loaded as a secure sub-system on machine i (block 206) and the machine runs a verification that it is running the right code and generates an attestation which is sent back to the client (block 208 and arrow 2 in FIG. 1). The verification may, for example, involve producing a hash of the loaded code, which then works as an identifier for the code and may be used as part of the attestation messages; alternatively the full loaded code may be used as part of the attestation messages. By using the loaded code as part of the attestation messages in some way, the attestation confirms the integrity of the loaded code (and hence the job code). In other examples, the machine may apply other checks to the code, such as verifying that it was signed by the user. The attestation includes a key generated by the machine i for the job, $K_i$ and is encrypted using the user's public key, $K_{user}$. The attestation messages may include the user's public key or a hash of the user's public key. The attestation confirms the machine type (e.g. "I am a CPU of type X") and this confirmation may be provided in the form of a data record signed with a key provided by the machine manufacturer (which may, for example, be stored in the machine quoting secure sub-system 104B), which is sent to the client. The attestation may additionally confirm which distributed computing system or part thereof (e.g. which cloud) the machine i is located in. This confirmation may be provided in the form of a data record signed with a key provided by the machine manufacturer and securely stored in the machine at the time of manufacture, and/or a data record signed with a private key for machine i (which may, for example, be generated and stored in the cloud quoting secure sub-system 104C) which is used to sign/encrypt some data which is sent to the client and may be provisioned by the system provider (e.g. the cloud provider) when setting up the distributed computing system, or may be provisioned by a third party.

Where a part of the attestation is based on a private key for machine i, the corresponding public key may be provided to the client when the machine is allocated to the client. Alternatively, the cloud provider may publicly list the machines that are part of the cloud computing system (e.g. in the form of a list of public keys which are signed with the private key of the cloud provider, where the public key of the cloud provider is known to customers and can be used to verify this signature). In another example, a group signature scheme is used, in which while each machine has its own private key, a single public can be used to verify signatures from any machine (this means that customers do not need to know one key per machine that they are using).

In response to receiving the attestation, the client verifies the message (block 210) and obtains the key generated by the machine i for the job, $K_i$. This verification (in block 210) comprises decrypting the message (e.g. using the user's private key), checking the signature(s) used to sign the data (e.g. by checking against revocation lists provided by the issuing entity), and reviewing the attestation data record (i.e. reviewing/checking the data included within the attestation messages). Reviewing the attestation data record may, for example, comprise checking the hashes of the loaded code and the user's public key when they are included in the attestation messages, or checking the full loaded code and the user's public key if they are included in the attestation messages. If the verification is successful (in block 210), the client uses the machine key for the job $K_i$ to encrypt the job key $K_{job}$ and sends this to machine i (block 212 and arrow 3 in FIG. 1).

On receipt of the message comprising the encrypted job key $K_{job}$, the secure sub-system within machine i is able to decrypt the message (block 214) using the machine key for the job $K_i$ which is known only to the secure sub-system 104 and not to the rest of the machine 102 to obtain the job key $K_{job}$. Once the secure sub-system has the job key $K_{job}$, it can decrypt the job code (block 216) which was received at the start of the interaction with the client (it was sent in block 204). This completes the set-up of the secure sub-system and the secure sub-system can then run the code on any input data which is provided.

The input data for a job, which is encrypted by the client 106 using $K_{in}$, may already be available to the machine i, e.g. it may be stored in a data store 108 within the cloud, or the input data may be provided subsequently either in one block or in multiple batches which are streamed to the machines. The key $K_i$, may be provided to the machine i in encrypted form along with the job key (in block 212) or subsequently.

Where the results and/or any intermediate data are to be kept secure, additional keys (e.g. $K_{map}$ and $K_{out}$) may be provided to the machine i in encrypted form along with the job key (in block 212) or subsequently.

Figure 3:
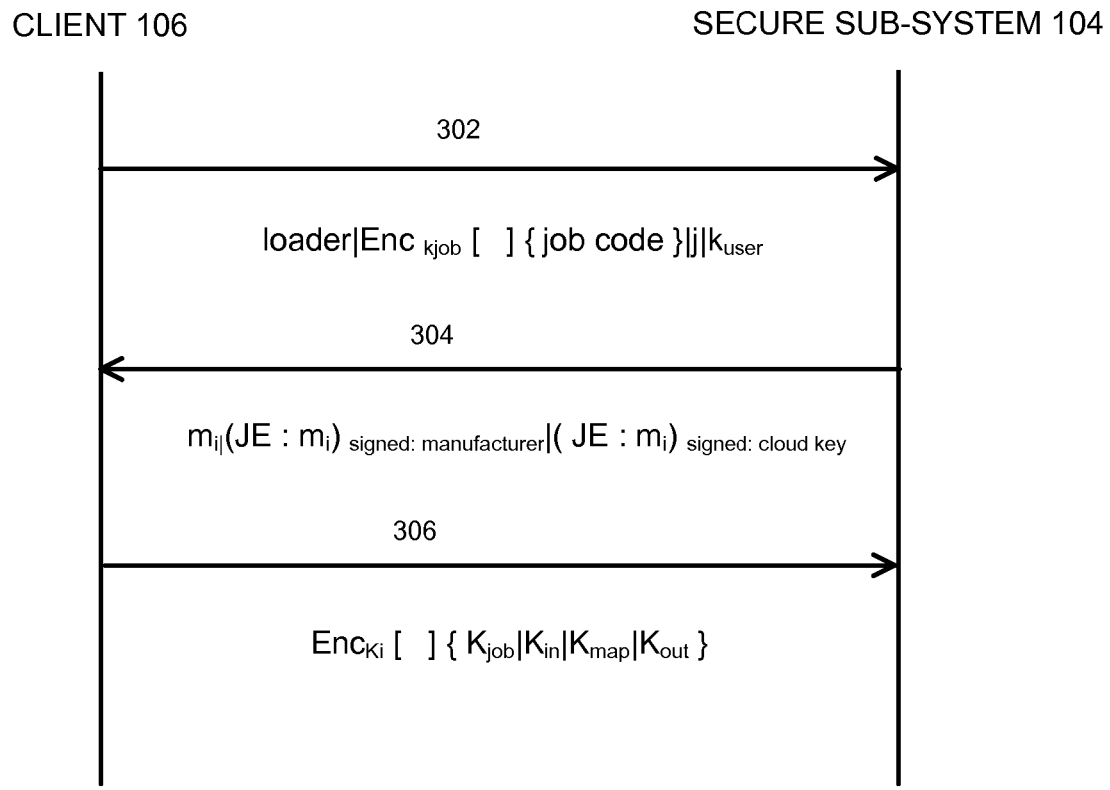
FIG. 3 shows an example message flow for a single user.

The method shown in FIG. 2 is described in more detail below and shown in the message flow of FIG. 3 using the following notation when describing the cryptography:

$Enc_K$(text, ad)—this denotes encrypted data which comprises the ciphertext (text) and optional additional data (ad) encrypted with key K In various examples, the encryption used is authenticated encryption with additional data (AEAD) which is indistinguishable under chosen plaintext attack (IND-CPA) and computationally infeasible to produce a ciphertext not previously produced by the sender (Integrity of CipherText, INT-CTXT). In various examples, AES-GCM (Advanced Encryption Standard-Galois/Counter Mode) may be used.

Where additional data is communicated together with the ciphertext, the following notation may be used:

$Enc_K$[ad]{text} as an abbreviation for ad|$Enc_K$(text, ad)

As described above, the client generates a new symmetric key $K_{job}$ for the job (block 202) and sends the job code in encrypted form to each machine 102 which is to perform the job (block 204 and arrow 1 in FIG. 1). The message sent to each machine (in block 204 and arrow 302) may comprise:

$JE = loader|Enc_{K_{job}}[\ ]\{job\ code\}|j|K_{user}$ where the loader may also be referred to as the secure sub-system (or enclave) public code and the job code may be referred to as the secure sub-system (or enclave) private code. The job identifier j may optionally not be included as part of JE. $K_{user}$ may also be optionally not included as part of JE. However including $K_{user}$ and/or j makes the system resilient to more attacks. In the case where $K_{user}$ is not included as part of JE, the job code will discover $K_{user}$ by interacting with an external system, e.g. by running a network protocol or by reading from a file.

On receipt of this code (as described above), the code is loaded as a secure sub-system on the machine (block 206) and an attestation is generated (block 208). In various examples the code that is loaded (in block 206) may be the full received code, JE. In other examples, however, a subset of the received code may be loaded initially (in block 206), e.g. just the loader|$K_{user}$ and then the loader may subsequently load the "job code" after applying some security checks (e.g. verifying that the "job code" was signed with $K_{user}$). In an example, the machine generates a symmetric job key $K_i$ and this is encrypted using the user's public key, $K_{user}$:

$m_i = PKEnc_{K_{user}}\{i|K_i\}$

The secure sub-system 104A gets both the quoting sub-systems 104B, 104C to sign $m_i$, linking it to its code identity JE (which may include both j and $K_{user}$) and sends an attestation to the client (arrow 304) of the form:

$m_i|(JE:m_i)_{signed:Manufacturer}|(JE:m_i)_{signed:cloud\ key}$ where signed:Manufacturer denotes the signature applied by the machine quoting secure sub-system 104B and signed: cloud key denotes the signature applied by the cloud quoting secure sub-system 104C. In another example, these signatures for attestation may use Hash(JE) instead of the full JE for efficiency (where Hash( ) is a collision resistant hash function). In another example, these signatures may use Hash($m_i$) for efficiency. In other examples, these signatures for attestation may include additional elements such as the access permissions for the memory pages where the code is loaded, or other configuration information.

In response to verifying this attestation (in block 210), the client may prepare all the necessary encrypted job credentials, such as:

$Enc_{K_i}[\ ]\{K_{job}|K_{in}|K_{map}|K_{out}\}$ and sends these to the machine i (in block 212 and arrow 306). The secure sub-system then decrypts the job credentials (using $K_i$), uses $K_{job}$ to decrypt the private code segment (the job code) and then runs the job code on the encrypted input data (which it decrypts using $K_{in}$), using the specified keys for the intermediate and/or output files ($K_{map}$ and $K_{out}$ respectively) to encrypt any data that is generated and passed out of the secure sub-system. The key $K_i$ is erased by the secure sub-system (e.g. once the job credentials have been decrypted) as it is no longer required and is specific to the particular job.

Figure 4:
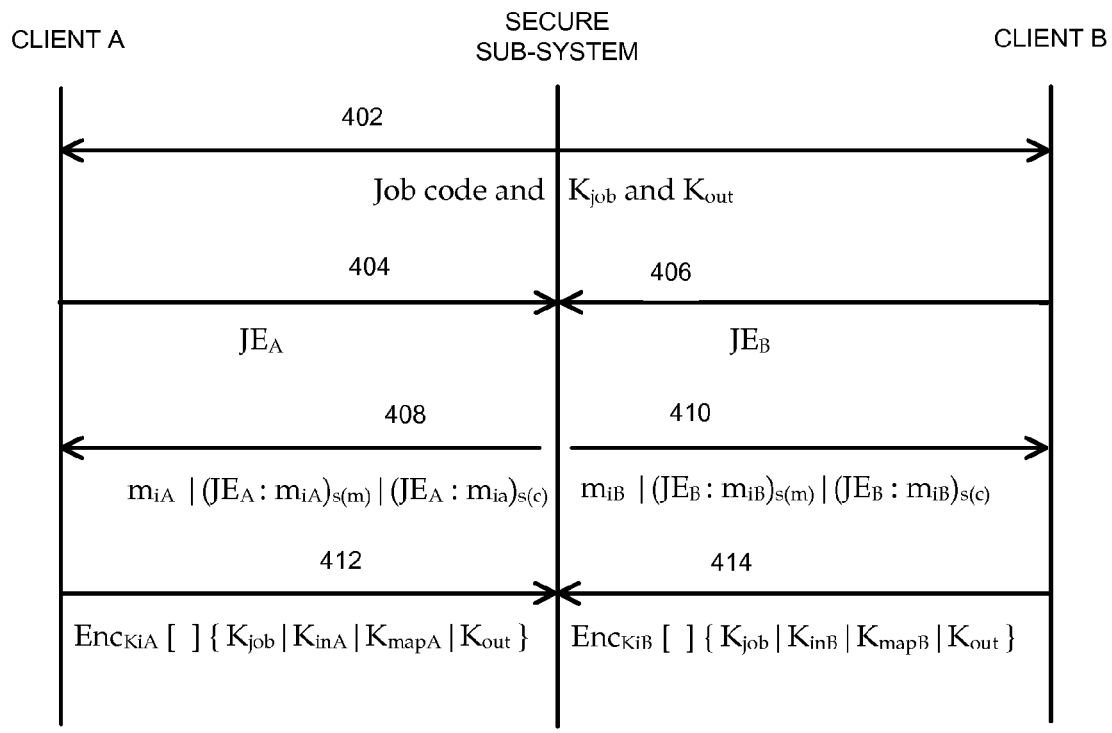
FIG. 4 shows an example message flow for two users.

The methods described above may be modified where there are multiple users that each provide a portion of the input data, as shown in the message flow in FIG. 4. FIG. 4 shows an example message flow with two users (and hence two clients); however the method may be extended to larger numbers of users. As described above, before running the protocol shown in FIG. 4, the users negotiate with the provider of the distributed computing system for some common resource allocation (e.g. 20 machines). A verification key may be sent to all users, where this verification key is the public key for the system provider. This key is known by all users and can be used to verify signatures from the system providers. For example a signature on the list of machines allocated for a job.

As shown in FIG. 4, the users agree on the code to run (the job code) and may also agree on the keys used for the job and for the output data, $K_{job}$ and $K_{out}$ (arrow 402). Each user then proceeds with the set-up protocol between their client and the secure sub-system on each allocated machine (again only a secure sub-system on one machine i is shown in FIG. 4).

As in block 204 of FIG. 2, each client then sends the job code in encrypted form to each machine (arrows 404 and 406) and the message may be in the form as described above, i.e.:

$$JE_A = \text{loader}|\text{Enc}_{K_{job}}[\ ]\{\text{job code}\}|j|K_{userA}$$

$$JE_B = \text{loader}|\text{Enc}_{K_{job}}[\ ]\{\text{job code}\}|j|K_{userB}$$

Or alternatively, one or both clients may send the same message, with both their public keys appended to the data segment at the end of the code:

$$JE_A = JE_B = \text{loader}|\text{Enc}_{K_{job}}[\ ]\{\text{job code}\}|j|K_{userA}|K_{userB}$$

This second alternative where both public keys are included in JE is resilient to more attacks.

As described above with reference to FIG. 2, the code received from both clients is loaded as a single secure sub-system on machine i (as in block 206, and the method is repeated on each of the allocated machines i) and machine i generates an attestation for the secure sub-system for both clients (as in block 208), each encapsulating a distinct, new, symmetric key $K_{iA}$, $K_{iB}$. As described above, the attestations may have the form:

$$m_{iA}|(JE_A:m_{iA})_{signed:Manufacturer}|(JE_A:m_{iA})_{signed:cloud\ key}$$

$$m_{iB}|(JE_B:m_{iB})_{signed:Manufacturer}|(JE_B:m_{iB})_{signed:cloud\ key}$$

Where $$m_{iA} = PK\text{Enc}_{K_{userA}}\{i|K_{iA}\}$$

$$m_{iB} = PK\text{Enc}_{K_{userB}}\{i|K_{iB}\}$$

For efficiency, the collection of messages (one for each client as indicated by arrows 408, 410) may be jointly signed once by the two quoting sub-systems 104B, 104C. For efficiency, the attestation messages may include hashes of JE, instead of the full contents of JE.

Each client then independently checks the attestation received from machine i (as in block 210) and then sends the encrypted job credentials to the secure sub-system on machine i (arrows 412, 414). As above the encrypted job credentials may have the form:

$$\text{Enc}_{K_{iA}}[\ ]\{K_{job}|K_{inA}|K_{mapA}|K_{out}\}$$

$$\text{Enc}_{K_{iB}}[\ ]\{K_{job}|K_{inB}|K_{mapB}|K_{out}\}$$

Using the received encrypted credentials, the secure sub-system decrypts the job code and may also check that all the received messages provide the same keys $K_{job}$ and $K_{out}$ (e.g. in a system where all users use the same keys $K_{job}$ and $K_{out}$). In other examples, each user may provide a different value of $K_{out}$ for use in encrypting the output for that user (e.g. $K_{outA}$, $K_{outB}$, etc.) and/or each user may provide job code encrypted with a different key (e.g. $K_{jobA}$, $K_{jobB}$, etc.). The value of $K_{map}$ is computed from $K_{mapA}$ and $K_{mapB}$, e.g. using:

$$K_{map} = \oplus_{X \in [A,B]} K_{mapX}$$

where the $\oplus$ function represents XOR, but other functions may alternatively be used.

At this stage, keys $K_{job}$ and $K_{out}$ are known to every client and every secure sub-system in the job; $K_{inX}$ is known to every secure sub-system in the job and to client X (where in this example $X \in [A,B]$) and $K_{map}$ is known to every secure sub-system in the job but not to any client. In another example, Kmap may be generated randomly by the job code (in one machine running the job) and distributed to the other machines, encrypted with Kjob. In another example, Kmap may be equal to Kjob. In these last two examples, there is no need for the users to include KmapA, KmapB, etc in the encrypted job credentials.

In the example of a multi-user variant described above (and shown in FIG. 4), each of the clients has access to the results. In other examples, however, the results may only be available to some of the clients (e.g. only one client may know $K_{out}$).

Some or all of the method steps described above may be performed ahead of any computations being run as a set-up phase. As described above, the job code and/or the input data may be pre-loaded into storage 108 within the distributed computing system 100, or may be provided at the time the computations are performed. Furthermore, this data may be provided at one time, or the input data may be streamed to the machines in parallel with the computation being performed. Having established all the job credentials (e.g. all the keys) and placed the job code within a secure sub-system, the computations can be triggered when required (e.g. when input data becomes available). In some examples, the input data may be output data from a previous computation. Alternatively, the method may be performed up to, and including, the verification of the attestations (e.g. in block 210 of FIG. 2) ahead of time (e.g. as this may take some time if the job requires an extensive number of machines) and then to start computation the job key (and other keys as required) may be sent to the machines i (as in block 212 of FIG. 2). Running the parts of the protocol that require interaction with the customer's systems (i.e. client 106 in FIG. 1) ahead of time may mean that after that initial setup phase the customer's systems can be offline/disconnected from the network. This is a useful feature, because when running jobs with many machines some machines will fail and other machines may need to be allocated to replace them (or more machines may be allocated to speed-up the job); when this happens it is useful to be able to allocate the machines without communicating with the customer's systems.

The methods above are described as being implemented on all the machines i that will perform computations. In some examples, however, the set-up may be performed with more machines than are actually required to perform the computations so that the system can accommodate machine failure without having to wait for a secure sub-system to be set up on a new machine (e.g. as described above).

Using the methods described above, the distributed computing system (or distributed data processing system) does not ever have access to unencrypted input data, output data or intermediate results. Although the same effect may be achieved using complex cryptography schemes (e.g. using homomorphic encryption schemes), such systems are inefficient and cannot be implemented in practice.

In the methods described above, all the job code is run within the secure sub-system 104. In other examples, however, there may be some code that is not sensitive and can run on the machine outside the secure sub-system and receive non-sensitive, unencrypted data to process. In an example, where the job code is processing credit card transaction records, the person's name and credit card number may be secured using $K_{in}$ and processed within a secure sub-system, whilst the actual transaction details (e.g. a purchase of $100 in a particular store) may be processed in clear text in the normal way. In such a system the job code may be re-written so that it can be divided into two parts, the first part which is encrypted with $K_{job}$ and the second part which is unencrypted (and this may be sent alongside the loader in message 302 or by another means). The methods described herein may be implemented flexibly to minimize the amount of data that needs to be encrypted and the number of computations which need to be performed within the secure environment of the secure sub-system.

Any reference herein to data being sent to a client or from a client to a machine is intended to refer to any means of communicating the information, including, but not limited to, writing into cloud storage, being sent over a socket, etc.

The methods described above with reference to FIGS. 1-4 provide confirmation to the client of the integrity of the machines (which may be CPUs) performing the computation and may be used for any computation within a distributed computing system. These methods may, for example, be used within a MapReduce platform (or framework), such as Apache™ Hadoop®. It will be appreciated that the MapReduce computation is an example of a data-flow computation, where the mappers and reducers are nodes in a dataflow graph and the techniques described herein are applicable to any computation that can be described by a dataflow graph (as well as to other distributed computations, as described earlier).

Figure 5:
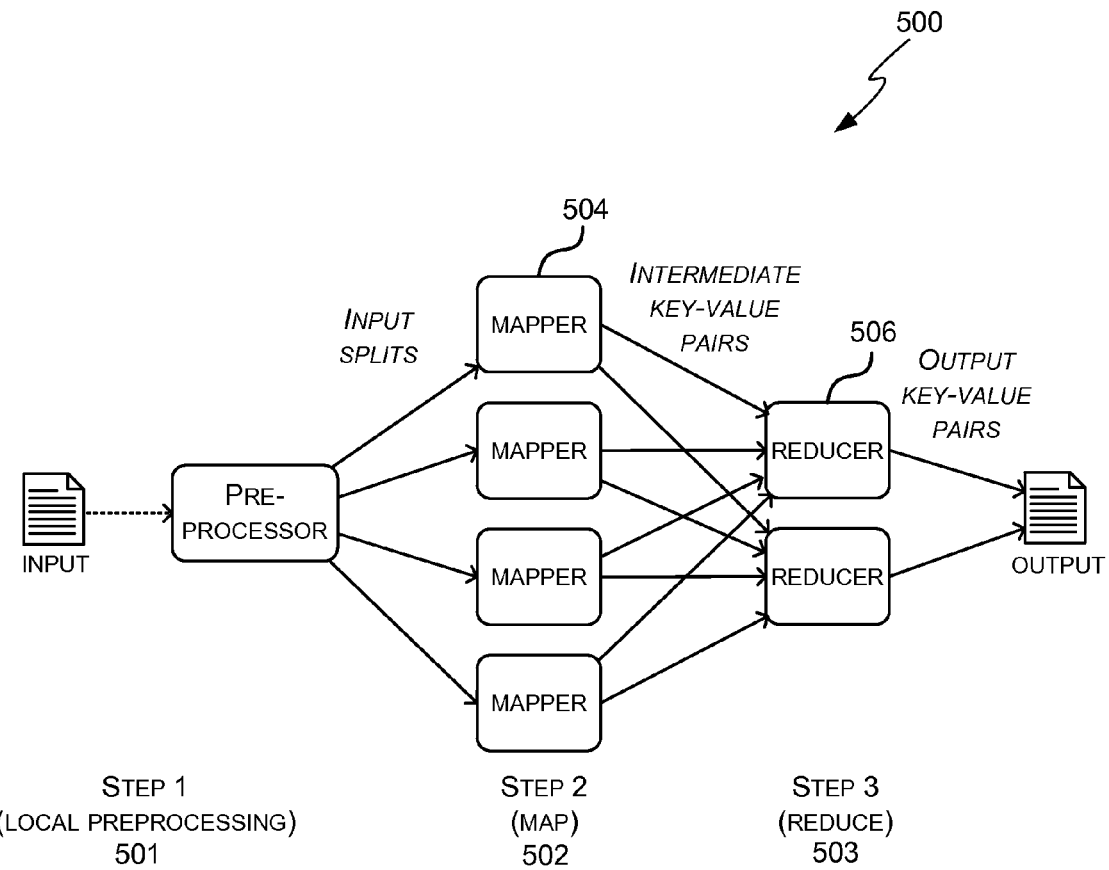
FIG. 5 is a schematic diagram showing the three steps of a MapReduce job.

FIG. 5 is a schematic diagram showing the three steps of a MapReduce job: local pre-processing 501, map 502 and reduce 503. The pre-processing 501, which may be performed external to the distributed computing system, divides the input data into blocks (which may be referred to as 'input splits' or 'map tasks') which should be passed to the individual mapper nodes 504 and encrypts each block (e.g. using $K_{in}$). In various examples, these blocks of input data may be between 64 MB and 256 MB in size once encrypted. In other examples, much smaller granularities may be used for the input splits, such as single words or lines in a text file.

In any MapReduce job, the MapReduce framework (e.g. the Apache™ Hadoop® framework) distributes input splits to the available distributed mappers 504. Each mapper 504 in turn parses the received input splits for key-value pairs. The mappers than call a function map(key,value) which processes the key value pair and generates a list of new key value pairs. These intermediate key-value pairs are then passed to the reducers 506 which group them by key and call a function reduce(key, set-of(values)) which generates a set of output key-value pairs which are the output of the computation. Using the methods described above, the intermediate key-value pairs may be encoded using $K_{map}$ and the output key-value pairs may be encoded using $K_{out}$. Each of the mappers and reducers may run within a secure sub-system on a machine and the integrity of the machine checked using the attestations and message protocol as described above. Other parts of the MapReduce framework (e.g. the main runtime which implements load-balancing, sorting, etc.) need not run within a secure sub-system and can be performed in the standard manner. This is also true where the methods are implemented in other data analytics platforms, such as Microsoft® Cosmos, Microsoft® Driad, Spark data analytics platform, Microsoft® SQL Datawarehousing products, etc.

In various examples, a standard MapReduce system may be split into two parts such that only a small part (e.g. the user code comprising the map( ) and reduce( ) functions) is executed within a secure sub-system on a machine and the rest is executed outside the secure sub-system.

To implement the methods described above, no modification is required to the MapReduce (e.g. Apache™ Hadoop®) framework. For example, an executable may be provided which runs within the streaming API in Apache™ Hadoop®. The executable provides the code to set up a secure sub-system and the code to pull data into and out of a secure sub-system. Tools/executables/components that make it convenient for users to work with encrypted files may also be provided.

Figure 6:
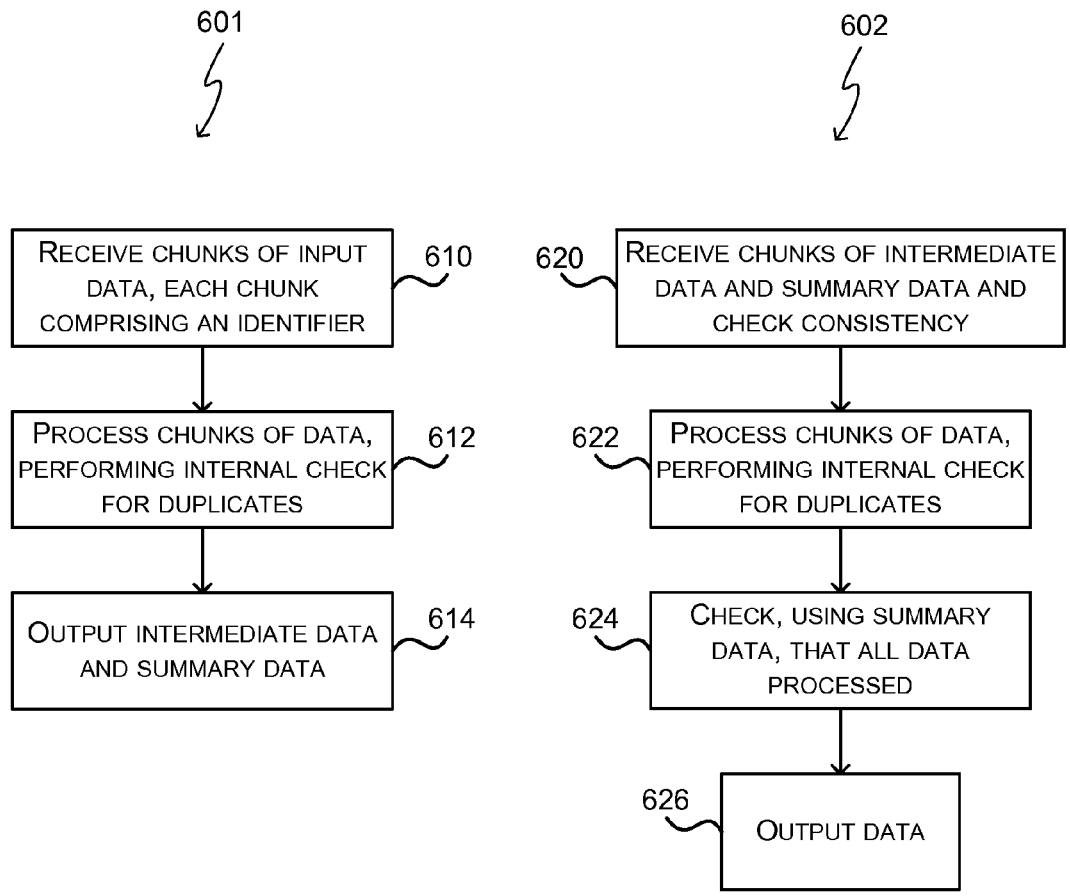
FIG. 6 shows flow diagrams of example methods of operation of data processing nodes within a MapReduce framework.
Figure 7:
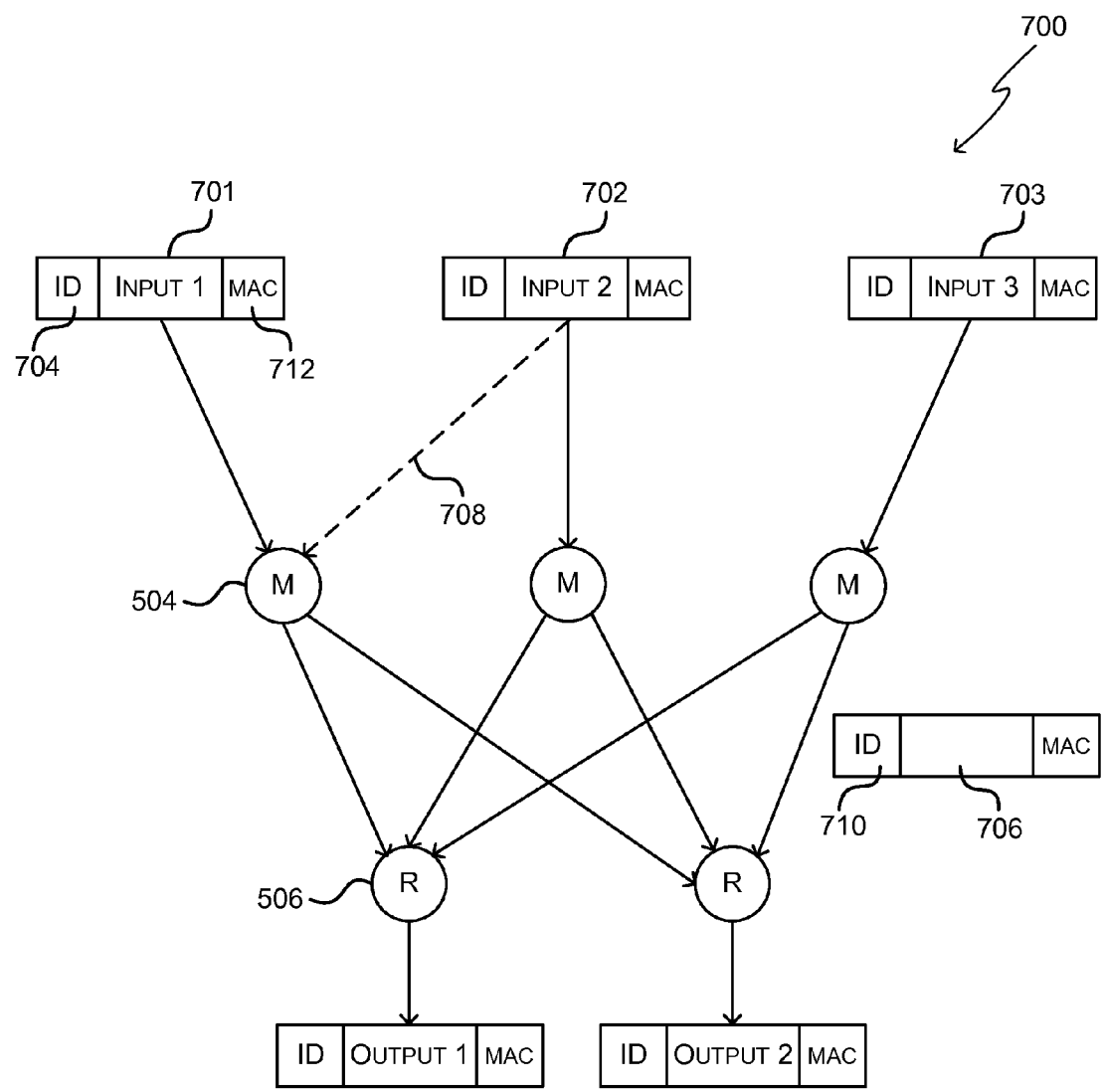
FIG. 7 is a schematic diagram of a MapReduce system.

The methods described in the following description with reference to FIGS. 6-7 are described as being implemented within a MapReduce framework (e.g. as shown in FIG. 5) and may be implemented in combination with the methods described above or independently. As described earlier, these methods (described with reference to FIGS. 6-7) may also be applied to other data-flow computations that do not have the MapReduce structure. The references to MapReduce in the following description are by way of example.

As described above, problems can occur within data analytics systems which process data in multiple stages, like MapReduce, where a malicious system operator drops messages, duplicates messages or inserts completely new messages. The methods described below check, however, that each produced datagram (e.g. input split or intermediate key-pair) contributes exactly once to the final job result (i.e. there is no deletion or duplication) and that only datagrams legitimately produced during the processing of the job contribute to the final job result.

FIG. 6 shows flow diagrams of example methods of operation of data processing nodes within a MapReduce framework 500, 700 such as shown in FIGS. 5 and 7. The first flow diagram 601 corresponds to a node which processes input data, such as a mapper 504, and the second flow diagram 602 corresponds to a node which processes intermediate data (i.e. data output by another data processing node), such as a reducer 506.

As shown in FIG. 7, each piece (or chunk) of input data 701-703 (which may be referred to as an input split) has a strong identifier 704 and is encrypted/authenticated (i.e. it has a message authentication code, MAC, that binds the identifier with the data and allows the system to detect if the data has been tampered with). The term 'strong identifier' is used herein to refer to the fact that the identifier is unique within the job (identifiers may be re-used for different jobs) and the input data and the corresponding ID are cryptographically bound together (e.g. the ID is encrypted within the data), such that the ID cannot be tampered with.

Mappers 504 receive chunks of input data (block 610) and process them (block 612) including performing an internal check for duplications (e.g. being sent the same input chunk twice for processing). If a duplicate is detected (in block 612), the mapper may stop processing altogether (e.g. and raise an error flag) or may discard the duplicate chunk. The mapper then outputs intermediate data 706 and summary data. This data is again encrypted and has another strong identifier 710. The summary data identifies all the input data that the mapper processed (e.g. using the input chunk identifiers 704) and enables the user (i.e. the person submitting the MapReduce job) or any trusted code to check that all the input chunks were processed only once across all the mappers 504 (e.g. that one block was not sent to two mappers, as indicated by the dotted arrow 708 in FIG. 7 and processed by both mappers). The summary data also identifies how much data is output by the mapper for each reducer.

As part of this method, the mappers 504 do not communicate with each other and each operates independently. However, the summaries which are generated and passed through the system along with the data enable nodes downstream and/or the user to check that all the summaries received are consistent (e.g. that there is no duplication between upstream nodes).

Reducers 506 receive the chunks of intermediate data 706 and the summary data from the mappers and check the received summaries for consistency (block 620). For example, if INPUT2 702 was sent to two mappers 504 (as indicated by arrow 708), the summaries from both mappers received at any of the reducers will not be consistent—both summaries will indicate that they processed INPUT2 and this duplication is an inconsistency. If an inconsistency is identified (in block 620), the reducer stops and may raise an error flag.

If, after receiving all the summaries expected for the job, there are no inconsistencies between summaries received, the reducer processes the chunks of intermediate data, checking for duplication as it proceeds (block 622) i.e. checking that it is not asked to process the same chunk more than once (e.g. based on the identifiers associated with each chunk of intermediate data).

As described above, the summary data generated by the mappers (and received by the reducers) includes a summary of the amount of data for each mapper (e.g. the number of intermediate data records that they produced for each reducer, where each intermediate data record has a strong identifier). Using this data, the reducers check that they have processed all the data that they should have (block 624) and only output data (block 626) if all the checks have been successfully passed (i.e. no inconsistencies identified in block 620, no duplicates identified in block 622 and all required data processed in block 624).

By using this method, the user (submitting the MapReduce job) can be sure that all the input data was processed exactly once at each stage and that the output was not modified by the system (e.g. cloud) provider. The additional summaries and identifiers are included within the data which is passed through the system and so are invisible to the system provider and furthermore, in various examples it may not be visible to the system provider whether the method described is being implemented or not (e.g. as the system provider will not know whether the data packets being passed contain only input data or additionally contain an identifier and the summary information). The data summaries follow the data flow. Furthermore as the input data and output data has the same format, it is possible to chain computations together, such that the output data from one computation forms the input data for a second computation.

An example implementation of the method described with reference to FIGS. 6 and 7 is now described in more detail. Although this description refers to keys from the first part of the description, as stated previously, these methods described with reference to FIGS. 6 and 7 may be implemented independently of the methods described with reference to FIGS. 1-4. In this example, the identifiers for the input data are incrementally assigned (e.g. starting from zero) when the data is divided into the input splits. The input split I and the corresponding ID $l_I$ of the input split may be cryptographically bound together by including the ID as additional authenticated data (AAD) in the message authentication code (MAC) 712 of the AES-GCM. Using the encryption notation from above, the extended input split $I^e$ may therefore be composed of:

$$I^e = \text{Enc}_{K_{IN}}[l_I]\{I\}$$

where $K_{IN}$ is the encryption key used. As described above, these extended input splits $I^e$ are generated external to the MapReduce framework and passed to the system (e.g. cloud) provider as input to the respective MapReduce job.

From each received (extended) input split, a mapper produces a set of intermediate key-value pairs (which may alternatively be referred to as keypairs). These key-value pairs are then assigned to reducers by the MapReduce framework according to the pairs' keys (this is known as partitioning). Key-value pairs with the same keys are generally processed by the same reducer (otherwise the output of the job is fragmented); however, users may wish to keep not only the value (in a key-value pair) but also the key of an intermediate key-value pair secret. In order to achieve this secrecy, the mappers may output intermediate key-value pairs $KV^e$ of the following form:

$$K^e = l_R = PRF_{K_{job}[PRF]}(k) \bmod N_{reducers}$$

$$V^e = \text{Enc}_{K_{map}}[l_m | l_R | n_{l_M, l_R}]\{K:V\}$$

$$KV^e = <K^e : V^e>$$

where PRF is a cryptographically secure hash function, $N_{reducers}$ is the number of reducers assigned to the job, $l_M$ is a unique ID randomly chosen by each mapper for itself (per job), $l_R$ is a reducer ID and a reducer may service one or more reducer IDs, $n_{l_M, l_R}$ is an incremental ID uniquely identifying a key-value pair in a mapper-reducer relationship. Each mapper keeps track of the number of intermediate key-value pairs it produces for each $l_R$. The first key-value pair produced for a reducer ID (identified by $l_R$) is assigned $n_{l_M, l_R}$ of value 0, the second one is assigned and ID of value 1 and so on. Thus, the tuple $(l_m, l_R, n_{l_M, l_R})$ uniquely identifies each intermediate key-value pair produced in a job. The way $K^e$ is derived above ensures that all intermediate key-value pairs KV with the same key are processed by the same reducer, without the cloud provider having visibility of the actual key or value.

In addition to the described conventional intermediate key-value pairs, mappers create closing key-value pairs in this example implementation. These are used by the reducers to verify the integrity of the job up to this step (e.g. as described above and shown in FIG. 6 block 620). As described in more detail below, different checks may be performed by the master reducer and those reducers which are not the master. These closing key-value pairs are processed and dispatched by the MapReduce framework in the same way as conventional key-value pairs and as a result this one-way control communication channel (implemented using the closing key-value pairs) between mappers and reducers is invisible to the MapReduce framework.

In an example, there may be two types of closing key-value pairs:

$$KV_{close,0} = <l_{R,0}:Enc_{K_{map}}[l_M|n_{l_M,l_R}||Bitmap_{II_m}]\{\ \}>$$

$$KV_{close,1} = <l_R:Enc_{K_{map}}[l_R|l_M|n_{l_M,l_R}]\{\ \}>$$

$KV_{close,0}$ is sent once by each mapper after having processed all input splits assigned to it by the MapReduce framework. With this closing key-value pair a mapper sends a representation of the set of input splits that were processed by the mapper, which in this example is in the form of an input split bitmap $Bitmap_{II_m}$ (but may alternatively be in another form, such as a list of IDs), to the master reducer, where in this implementation, the reducer serving key-value pairs with $l_R=0$ automatically becomes the master reducer. This means that the key-value pairs just follow the normal data flow and the additional information in the form of the bitmap is automatically received by the master reducer. The master reducer combines all received representations of the set of input splits (e.g. bitmaps in this example), checks for duplicate input splits and optionally checks for missing input splits. In another example, the mappers or the master reducer just output verification information and the checks for duplicates and/or missing inputs are performed by the user. The master reducer outputs a special key-value pair $KV_{attest,master}$ containing the range of input splits processed in the job and a hash of all mappers IDs $l_M$ it received, e.g. having the form:

$$KV_{attest,master} = <0:Enc_{K_{out}}[Hash_{ID}(l_{M,0},l_{M,1},\ldots)|Bitmap_I^{combined}]\{\ \}>$$

This special output key-value pair enables the user to verify that indeed all input splits were processed that they passed as input data to the system provider. The term $Bitmap_I^{combined}$ in the above expression is a representation of the union of the sets of IDs processed and as described above, this may be represented in ways other than a bitmap (e.g. a list of IDs). The hash of all mappers IDs ($Hash_{ID}$) is optional, but including it makes the system resilient to more attacks. In another alternative, a list of mapper IDs is used in $KV_{attest,master}$ instead of a hash of a list of mapper IDs.

Each mapper sends $KV_{close,1}$ once to each possible reducer ID $l_R$ after having processed all input splits. With this closing key-value pair, reducers are made aware of how many intermediate key-value pairs (zero or more) to expect from each mapper for the respective reducer ID $l_R$. Once a reducer has received all intermediate key-value pairs for the reducer IDs it services, it outputs a special key-value pair $KV_{attest}$ that contains a hash of all mapper IDs $l_M$ it received closing messages from as well as its reducer IDs:

$$KV_{attest} = <0:Enc_{K_{out}}[Hash_{ID}(l_{M,0},l_{M,1},\ldots)|l_{R,x}|l_{R,y}|\ldots]\{\ \}>$$

As above, the hash of mappers IDs ($Hash_{ID}$) is optional, but including it makes the system resilient to more attacks. In another alternative, a list of mapper IDs is used in $KV_{attest}$ instead of a hash of a list of mapper IDs. In the case where a reducer receives duplicate intermediate key-value pairs it terminates itself without outputting $KV_{attest}$. These special output key-value pairs enable the user to verify that no intermediate key-value pairs (produced by the mappers) were dropped or duplicated. First the user can verify that each expected $l_R$ is contained within exactly one $KV_{attest}$ and second, the user can verify that each $KV_{attest}$ contains exactly the same hash of mapper IDs as is contained in the $KV_{attest,master}$ output of the master reducer.

The detailed implementation as described above guarantees the overall integrity of the mapper inputs and outputs and the reducer inputs. To protect the reducer outputs, reducers keep track of the number of key-value pairs that they output. Each reducer assigns each of its output key-value pairs a unique incremental ID $n_{l_R}$ starting from zero. The format of the output key-value pairs is as follows:

$$KV_{output}^e = <0:Enc_{K_{out}}[l_R|n_R]\{KV_{output}\}>$$

In order to enable the user to verify the overall integrity of reducer outputs, each reducer outputs the following special key-value pair for each of the reducer IDs it serviced, once it has processed all its inputs:

$$KV_{output,closing} = <0:Enc_{K_{out}}[l_R|n_{l_R}]\{\ \}>$$

$KV_{output,closing}$ contains a total number of output key-value pairs a reducer produced for a certain reducer ID $l_R$. The user can verify the overall integrity of the output key-value pairs by simply counting the output key-value pairs for each $l_R$. The user can verify that each expected reducer ID $l_R$ is contained in exactly one $KV_{output,closing}$ output key-value pair. In another example, the output of the reducers is grouped in chunks of key-value pairs as follows:

$$KV_{output}^e = <0:Enc_{K_{out}}[l_R|n_{l_R}]\{KV_{output\ 1},KV_{output\ 2},\ldots,KV_{output\ n}\}>$$

In this example, the verification checks proceed as above, except that the user counts the number of chunks, instead of individual key-value pairs.

As described above, the methods may be implemented for any data-flow computation, of which MapReduce is one example. Where alternative data-flow computations are used, the computation nodes (which are equivalent to the mappers and reducers in MapReduce) have strong identifiers, the messages/datagrams have strong identifiers and their integrity is protected with MACs, the computation nodes output summaries detailing how many messages/datagrams they have sent to other computation nodes, each computation node verifiers the MACs and detects duplicates, and each computation node verifies the summaries and terminates or produces and error if an anomaly is detected.

As described above, in various examples the methods shown in FIGS. 1-7 may be combined such that the methods described in the first part above are used to establish keys and verify the identity of machines and the integrity of their secure sub-systems which then perform data-flow (e.g. MapReduce) computations with the additional security mechanisms provided by the use of strong identifiers and data summaries as described in the second part above. This combination provides a user with the ability to remotely check the configuration of the data-flow (e.g. MapReduce) system (e.g. through the attestations received when sharing keys in a set-up phase) and to verify the results of the computations performed, using the summaries which are generated by the reducers. As described above, the methods may be implemented where the computation is performed for one user or for multi-user computations (e.g. where each party has some of the input data but all parties can share the results).

Figure 8:
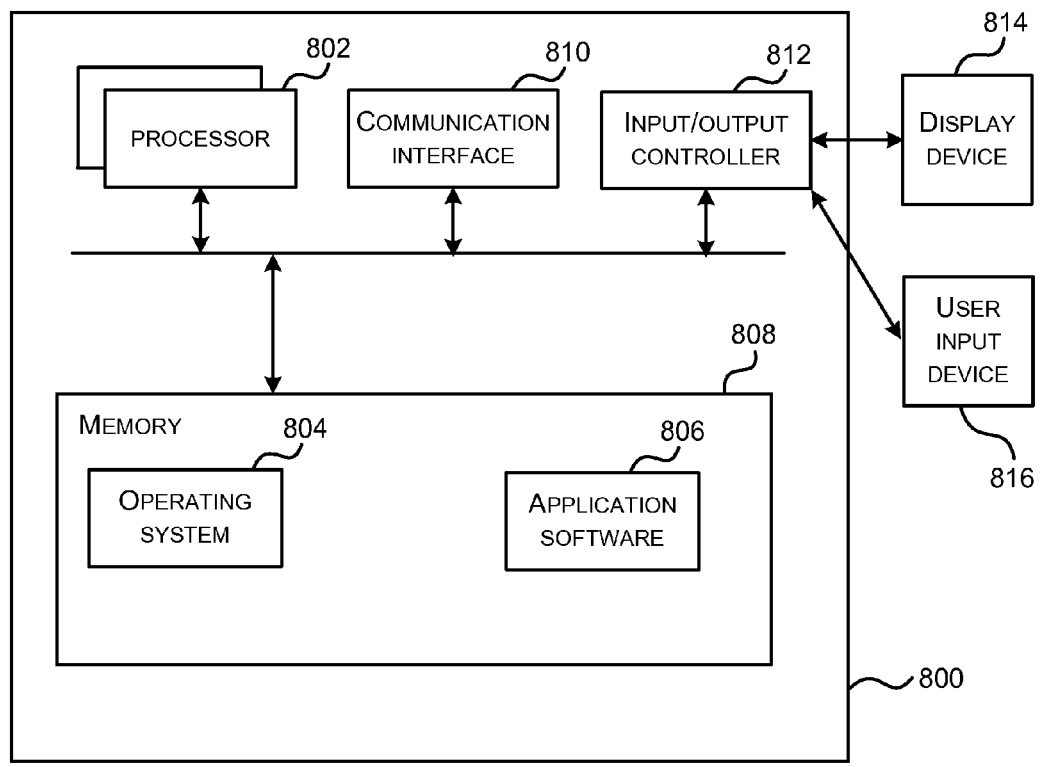
FIG. 8 illustrates an exemplary computing-based device in which embodiments of the methods described herein may be implemented.

FIG. 8 illustrates various components of an exemplary computing-based device 800 which may be implemented as any form of a computing and/or electronic device, and in which embodiments of the methods described herein may be implemented. The computing-based device 800 may, for example, comprise a node in a distributed computing system, such as a machine 102 in the system 100 and/or as a mapper 504 and/or a reducer 506 in the system of FIGS. 5 and/or 7. In other examples, the computing-based device 800 may host the client 106 in the system 100 of FIG. 1.

Computing-based device 800 comprises one or more processors 802 which may be microprocessors, controllers or any other suitable type of processors for processing computer executable instructions to control the operation of the device in order to implement the methods described herein. In some examples, for example where a system on a chip architecture is used, the processors 802 may include one or more fixed function blocks (also referred to as accelerators) which implement a part of the trusted execution methods in hardware (rather than software or firmware). Where the computing-based device 800 comprises a machine 102 in the system 100, this machine 102 may be a hardware processor (e.g. CPU) 802 and in such examples, the processor may comprise hardware/firmware for generating secure sub-systems as described above.

Platform software comprising an operating system 804 or any other suitable platform software may be provided at the computing-based device to enable application software 806 to be executed on the device.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

The computer executable instructions may be provided using any computer-readable media that is accessible by computing based device 800. Computer-readable media may include, for example, computer storage media such as memory 808 and communications media. Computer storage media, such as memory 808, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 808) is shown within the computing-based device 800 it will be appreciated that the storage may be distributed or located remotely and accessed via a network or other communication link (e.g. using communication interface 810).

The computing-based device 800 may also comprises an input/output controller 812 arranged to output display information to a display device 814 which may be separate from or integral to the computing-based device 800. The display information may provide a graphical user interface. The input/output controller 812 is also arranged to receive and process input from one or more devices, such as a user input device 816 (e.g. a mouse, keyboard, camera, microphone or other sensor). In some examples the user input device 816 may detect voice input, user gestures or other user actions and may provide a natural user interface (NUI). Where the computing-based device 800 hosts the client 106 of the system of FIG. 1, this user input may be used to initiate jobs within a distributed computing system. In an embodiment the display device 814 may also act as the user input device 816 if it is a touch sensitive display device. The input/output controller 812 may also output data to devices other than the display device, e.g. a locally connected printing device (not shown in FIG. 8).

Any of the input/output controller 812, display device 814 and the user input device 816 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Although the present examples are described and illustrated herein as being implemented in a MapReduce system (e.g. as shown in FIG. 5), the system described is provided as an example and not a limitation. As those skilled in the art will appreciate, the present examples are suitable for application in a variety of different types of distributed computing systems, including systems for performing other data-flow computations.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method of establishing a trusted component on each of a plurality of machines for execution of a job in a distributed computing system, each machine being arranged to provide at least one sub-system that is protected from the rest of the machine, and the method comprising:
   receiving, at a machine in the distributed computing system, code comprising a public key of a user, loader code and job code from a client, wherein the loader code is unencrypted and the job code is encrypted using a job code key generated by the client;
   loading at least the loader code within a secure sub-system in the machine;
   generating an attestation within the secure sub-system based on the received code, the attestation confirming at least an identity of the machine and integrity of the job code;
   sending the attestation to the client for verification; and
   at least one of:
      receiving, at the machine, in response to successful verification of the attestation by the client, a message comprising the job code key encrypted using a symmetric job key; decrypting the job code key within the secure sub-system using the symmetric job key; and decrypting the job code using the job code key; or
      receiving, at the machine, input data from each of multiple users encrypted using an input data key for the user; decrypting, within the secure sub-system, the input data using the input data keys for each user; executing the job code on the decrypted input data to generate results data; and sending at least a subset of the results data to the client associated with each of the users.

2. The method according to claim 1, wherein the attestation comprises the symmetric job key generated within the secure sub-system encrypted using the public key of the user and the method further comprises:
   receiving, at the machine, in response to successful verification of the attestation by the client, the message comprising the job code key encrypted using the symmetric job key;
   decrypting the job code key within the secure sub-system using the symmetric job key; and
   decrypting the job code using the job code key.

3. The method according to claim 2, wherein the message comprising the job code key encrypted using the symmetric job key further comprises the input data key encrypted using the symmetric job key, and the method further comprises:
   receiving input data encrypted using the input data key;
   decrypting, within the secure sub-system, the input data using the input data key; and
   executing the job code on the decrypted input data to generate results data.

4. The method according to claim 3, wherein the message comprising the job code key encrypted using the symmetric job key further comprises a results data key encrypted using the symmetric job key, and the method further comprises:
   encrypting, within the secure sub-system, the results data using the results data key; and
   sending the encrypted results data to one of the client and another machine within the system.

5. The method according to claim 4, wherein the results data comprise intermediate results, the results data key comprises a key for the intermediate results and the encrypted results are sent to another machine within the system.

6. The method according to claim 3, wherein receiving input data encrypted using the input data key comprises:
receiving chunks of input data encrypted using the input data key, each chunk of input data comprising an identifier;
and the method further comprises, within the secure sub-system:
checking for duplicate chunks of input data when executing the job code on the decrypted input data to generate results data;
generating a summary of all input data processed; and
outputting the results data and the summary in encrypted form.

7. The method according to claim 6, wherein each chunk of input data comprises intermediate results and an intermediate summary generated by another machine in the system, the method further comprising:
prior to outputting the results data and the summary, using the intermediate summary to check that all input data has been processed.

8. The method according to claim 1, further comprising, at the client:
generating the job code key, wherein the job code key is a symmetric key;
sending code to the machine in the distributed computing system, the code comprising the public key of the user, unencrypted loader code and job code is encrypted using the generated job code key;
verifying the attestation generated within the secure sub-system based on the code sent to the machine; and
in response to successful verification, sending a message to the machine comprising the job code key and at least one other key encrypted using the symmetric job key.

9. The method according to claim 1, wherein the job is associated with multiple users, and the machine in the distributed computing system receives code comprising the public key of each user, loader code and job code from one or more clients, wherein the loader code is unencrypted and the job code is encrypted using the job code key, wherein the generated attestation is sent to the client associated with each of the users, and wherein the method further comprises:
receiving input data from each of the users encrypted using the input data key for the user;
decrypting, within the secure sub-system, the input data using the input data keys for each user;
executing the job code on the decrypted input data to generate results data; and
sending at least a subset of the results data to the client associated with each of the users.

10. A distributed computing system comprising:
a plurality of input computation nodes wherein each input computation node comprises a secure sub-system arranged to receive encrypted chunks of input data, each chunk comprising an identifier for the chunk, to perform an internal check for duplicate chunks and process the input data to generate intermediate data, and to output encrypted intermediate data and summary data to one or more intermediate computation nodes;
a plurality of intermediate computation nodes wherein each intermediate computation node comprises a secure sub-system arranged to receive encrypted intermediate data and summaries from one or more input computation nodes, to perform an internal check for duplicate or missing intermediate data and process the intermediate data to generate output data; and
at least one of:
receiving, at a machine, in response to successful verification of an attestation by a client, a message comprising a job code key encrypted using a symmetric job key, the attestation comprising the symmetric job key generated within the secure sub-system of a first input or intermediate computation node encrypted using a public key of a user, the machine further arranged to decrypt the job code key within the secure sub-system using the symmetric job key and decrypt the job code using the job code key; or
receiving, at the machine, input data from each of multiple users encrypted using an input data key for the user; decrypting, within the secure sub-system, the input data using the input data keys for each user; executing the job code on the decrypted input data to generate results data; and sending at least a subset of the results data to the client associated with each of the users.

11. The system according to claim 10, wherein each intermediate computation node is further arranged to check all intermediate data has been processed based on the received summary data before outputting the output data.

12. The system according to claim 10, wherein each input computation node is a mapper node, each intermediate computation node is a reducer node.

13. The system according to claim 12, wherein the intermediate data comprises a plurality of key-value pairs and the summary data output by a mapper node to a reducer node comprises a number of key-value pairs generated by that mapper node for that reducer node.

14. The system according to claim 10, wherein each secure sub-system is protected from the rest of the node and wherein the secure sub-system is arranged to decrypt and process encrypted data received at the node and to encrypt any data generated when processing the encrypted data before it is output from the secure sub-system.

15. The system according to claim 14, wherein each node is arranged, prior to processing data, to:
receive code from the client, the code comprising the public key of the user, loader code and job code for use in processing data, wherein the loader code is unencrypted and the job code is encrypted using the job code key generated by the client;
load at least the loader code into the secure sub-system;
generate the attestation within the secure sub-system based on the received code, the attestation confirming at least an identity of the node and integrity of the job code; and
send the attestation to the client for verification.

16. The system according to claim 15, wherein each node is further arranged, prior to processing data using the job code, to:
receive, in response to successful verification of the attestation by the client, the message comprising the job code key and the encryption key for the data encrypted using the symmetric job key;
decrypt the job code key and the encryption key for the data within the secure sub-system using the symmetric job key; and
decrypt the job code within the secure sub-system using the job code key.

17. The system according to claim 15, wherein each node further comprises a quoting secure sub-system that is protected from the rest of the node and is arranged to store a key issued by a manufacturer of the node for use in generating the attestation.

18. The system according to claim 15, wherein each node is arranged to store a key issued by a provider of the system to verify a location of the node within the system when generating the attestation.

19. A distributed computing system comprising a plurality of machines, each machine comprising:
- a first secure sub-system that is protected from the rest of the machine and is arranged to process input data using job code;
- one or more further secure sub-systems that are protected from the rest of the machine and are arranged to store a key provisioned by a manufacturer of the machine and a key provisioned by an operator of the system;
- wherein the machine is arranged to receive code comprising a public key of a user, loader code and job code from a client, wherein the loader code is unencrypted and the job code is encrypted using a job code key generated by the client and to load at least the loader code into the first secure sub-system;
- the first secure sub-system is arranged to generate an attestation for the client based on the received code and using keys stored in the one or more further secure sub-systems, the attestation confirming an identity of the machine, integrity of the job code and an attribute of the distributed computing system or part thereof; and at least one of:
- the machine further arranged to receive, in response to successful verification of the attestation by a client, a message comprising the job code key encrypted using a symmetric job key, the attestation comprising the symmetric job key generated within the first secure sub-system encrypted using the public key of the user, the machine further arranged to decrypt the job code key within the secure sub-system using the symmetric job key and decrypt the job code using the job code key; or
- receiving, at the machine, input data from each of multiple users encrypted using an input data key for the user; decrypting, within the secure sub-system, the input data using the input data keys for each user; executing the job code on the decrypted input data to generate results data; and sending at least a subset of the results data to the client associated with each of the users.

20. The distributed computing system of claim 19 further comprising a management system arranged to dynamically execute at least one of creating or destroying at least the first secure sub-system.

* * * * *